United States Patent [19]

Ohmori

[11] 4,267,302

[45] May 12, 1981

[54] EPOXY RESIN COMPOSITION CONTAINING PERFLUOROALKYL EPOXIDE

[75] Inventor: Akira Ohmori, Ibaraki, Japan

[73] Assignee: Daikin Kogyo Co., Ltd., Osaka, Japan

[21] Appl. No.: 78,827

[22] Filed: Sep. 25, 1979

[30] Foreign Application Priority Data

Sep. 29, 1978 [JP] Japan .................................. 53-120670

[51] Int. Cl.$^3$ ............................................. C08G 59/20
[52] U.S. Cl. .............................. 528/103; 252/188.3 R; 528/366; 528/402
[58] Field of Search ........................ 528/103, 366, 402; 252/188.3 R

[56] References Cited

U.S. PATENT DOCUMENTS

| | | | |
|---|---|---|---|
| 3,361,685 | 1/1968 | Pittman et al. | 260/2 |
| 3,388,078 | 6/1968 | Evans et al. | 260/2 |
| 3,707,483 | 12/1972 | Reines | 260/348 R |
| 3,849,450 | 11/1974 | O'Rear et al. | 260/348 R |
| 3,914,202 | 10/1975 | Shelley | 260/47 EP |

*Primary Examiner*—Earl A. Nielsen
*Attorney, Agent, or Firm*—Birch, Stewart, Kolasch & Birch

[57] ABSTRACT

An epoxy resin composition which comprises:
(1) a monoepoxide having at least one perfluoroalkyl group in one molecule; and
(2) an epoxy resin having two or more epoxy groups in one molecule, the weight ratio of (1):(2) being 0.05:99.95 to 50:50. The composition can be cured with a curing agent to give a cured product having improved water-proof, oil-resistance and anti-contamination properties.

12 Claims, No Drawings

EPOXY RESIN COMPOSITION CONTAINING PERFLUOROALKYL EPOXIDE

The present invention relates to an epoxy resin composition, and more particularly, to an epoxy resin composition which can be cured to give a cured product.

An epoxy resin is one kind of pre-polymer and a curable composition thereof with a curing agent has excellent adherent properties to various materials. Therefore, such a curable composition can be used as a paint or an adhesion. Further, cured products thereof are used as materials for laminated structures, materials for civil engineering and construction, materials for electric goods and the like.

However, since the cured product, which is the final product from the curable composition, contains a functional group such as amino, hydroxy and the like, the water-proof properties, oil-resistance properties and/or anti-contamination properties thereof are generally inferior.

The main object of the present invention is to provide an epoxy resin composition which can be cured with a curing agent to give a cured product having improved water-proof properties, oil-resistance properties and anti-contamination properties. This object as well as other objects and advantages of the present invention will become apparent to those skilled in the art from the following description.

According to the present invention, these objects can be generally accomplished by providing an epoxy resin composition, which comprises:

(1) a monoepoxide having at least one perfluoroalkyl group in one molecule; and (2) an epoxy resin having two or more epoxy groups in one molecule, the weight ratio of (1):(2) being 0.05:99.95 to 50:50.

Upon curing with a curing agent, the composition of the present invention forms a hardened coating film or a hardened molded product, the surface of which has excellent water- and oil-repellancy.

It is necessary that the monoepoxide (1) used in the present invention should have at least one perfluoroalkyl group, in the molecule thereof. When the monoepoxide contains no perfluoroalkyl groups, it is difficult to obtain a cured product having water- and oil-repellancy.

As a monoepoxide (1), a compound of the formula:

$$R_f(CH_2)_mO_nCH_2CHCH_2 \quad (I)$$
$$\underset{O}{\backslash /}$$

wherein $R_f$ is a perfluoroalkyl group having 1 to 18 carbon atoms; m is 0 or an integer from 1 to 3; and n is 0 or 1, or a mixture thereof may be employed. Preferred examples of the above compounds are those of the formula:

$$CF_3CF_2(CF_2CF_2)_3CH_2OCH_2CHCH_2$$
$$\underset{O}{\backslash /}$$

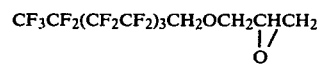

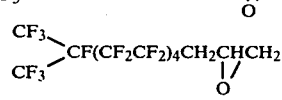

or $$CF_3CF_2(CF_2CF_2)_3CH_2CHCH_2$$
$$\underset{O}{\backslash /}$$

The above monoepoxide can be prepared by a known method. For example, the monoepoxide can be prepared according to the following reaction:

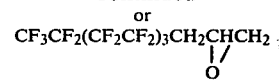 (A)

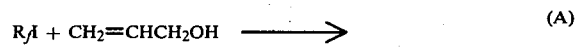

or (B)

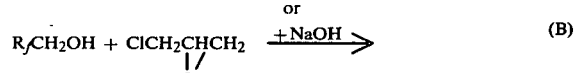

The epoxy resin (2) used in the present invention has two or more epoxy groups, particularly, two to four epoxy groups, in the molecule thereof. It is difficult to obtain a rigid cured product by curing an epoxy resin composition mixed with a curing agent unless the epoxy resin to be used has two or more epoxy groups.

As an epoxy resin (2), a compound of the formula:

$$CH_2CHRCHCH_2$$
$$\underset{O}{\backslash /}\underset{O}{\ |/}$$

or $$CH_2CHCH_2OR-(OCH_2CHCH_2OR)_j-OCH_2CHCH_2 \quad (II)$$
$$\underset{O}{\backslash /} \quad \underset{OH}{|} \quad \underset{O}{|/}$$

wherein j is 0 or an integer from 1 to 15, preferably 0, 1 or 2; and R is $C_kH_{2k}$ (wherein k is an integer from 2 to 8), $(CH_2)_y(CF_2)_p(CH_2)_y$ (wherein y is 1 or 2 and p is an integer from 2 to 10) or a group of the formula:

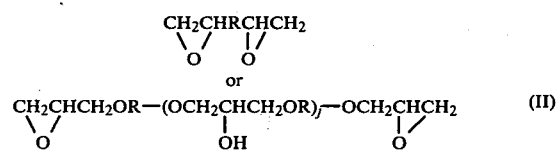

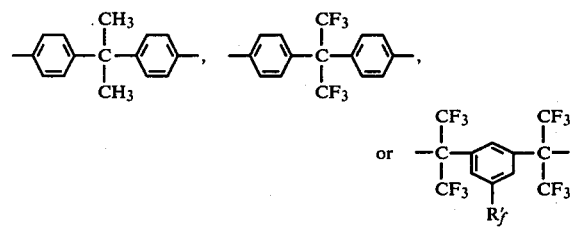

(wherein $R_f'$ is a perfluoroalkyl group having 3 to 10 carbon atoms), or a mixture thereof may be employed. Preferred examples of the above compounds are those of the formula:

$$CH_2CHCH_2O(CH_2)_4OCH_2CHCH_2$$
$$\underset{O}{\backslash /} \quad \underset{O}{|/}$$

$$CH_2CHCH_2(CF_2)_{p'}CH_2CHCH_2$$
$$\underset{O}{\backslash /} \quad \underset{O}{|/}$$

wherein p' is an integer from 4 to 10, or $$CH_2CHCH_2OCH_2(CF_2)_{p''}CH_2OCH_2CHCH_2$$
$$\underset{O}{\backslash /} \quad \underset{O}{|/}$$

wherein p″ is an integer from 3 to 10. The above epoxy resin can be prepared by a known method.

The epoxy resin composition of the present invention contains 0.05 to 50% by weight, preferably, 1 to 30% by weight of the monoepoxide (1) and 99.95 to 50% by weight, preferably, 99 to 70% by weight of the epoxy resin (2) based on the total weight of the composition. That is, in the epoxy resin composition of the present invention, the weight ratio of the monoepoxide (1) to the epoxy resin (2) is 0.05:99.95 to 50:50, preferably, 1:99 to 30:70. When the amount of the monoepoxide (1) is less than 0.05% by weight, the desired results can hardly be obtained. On the other hand, when the amount thereof is more than 50% by weight, a remarkable improvement in the quality of the cured product can hardly be expected and the mechanical properties thereof become inferior.

The epoxy resin composition of the present invention can be prepared by mixing the above monoepoxide (1) and the above epoxy resin (2) according to a conventional technique.

The epoxy resin composition of the present invention can be cured according to a known method for curing a conventional epoxy resin. For example, the epoxy resin composition can be cured by adding a curing agent such as an alkylene diamine having 1 to 12 carbon atoms in the alkylene moiety (e.g. ethylene diamine, propylene diamine etc.), a polyethylene polyamine (e.g. diethylene triamine, triethylene tetramine, tetraethylene pentamine etc.), diphenyldiaminomethane, a tertiary alkylamine having 1 to 6 carbon atoms in the alkyl moiety (e.g. trimethylamine, triethylamine, tripropylamine etc.), an acid anhydride (e.g. phthalic anhydride, hexahydrophthalic anhydride, dodecenyl succinic anhydride etc.) or a boron trifluoride-amine complex (e.g. $BF_3C_2H_5NH_2$, 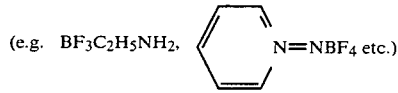 $N=NBF_4$ etc.)

and reacting at room temperature or with heating to about 200° C. The amount of curing agent to be added to the epoxy resin composition is not critical, but when the boron trifluoride-amide complex or tertiary alkylamine is used, it is usually used in an amount of 0.5 to 5% by weight based on the weight of the epoxy resin composition, and when the alkylene diamine, polyethylene polyamine, diphenyldiaminomethane or acid anhydride is used, it is usually used in an amount of 0.8 to 1.2 equivalent per 1 equivalent of epoxy group of the epoxy resin. A curable composition prepared by mixing the above epoxy resin composition with a curing agent is also included in the scope of the present invention. Optionally, the curable composition may contain other additives such as alumina, silica, titanium dioxide, glass fiber, and the like.

The following examples further illustrate the present invention in detail but are not to be construed to limit the scope thereof. In the examples, all "parts" are by weight unless otherwise stated.

EXAMPLE 1

To 100 parts of the compound of the formula:

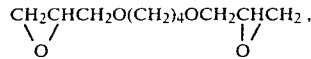

there was added the compound of the formula:

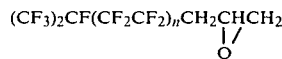

wherein n is 0 or 1, in the amounts shown in Table 1 and also 3 parts of the curing agent, $BF_3C_2H_5NH_2$, to obtain a solution. The resulting solution was applied on a clean aluminum plate and cured at 110° C. for 2 hours. The contact angles of water and n-hexadecane against the cured coating film thus obtained were determined.

The results are shown in Table 1.

TABLE 1

| n | Amount (parts) | Contact angle (degrees) Water | n-Hexadecane |
|---|---|---|---|
| 0 | 10 | 58 | 56 |
|   | 3 | 56 | 56 |
|   | 1 | 55 | 49 |
|   | 0.1 | 51 | 31 |
| 1 | 30 | 74 | 57 |
|   | 15 | 64 | 56 |
|   | 10 | 66 | 56 |
|   | 5 | 61 | 56 |
|   | 1 | 58 | 52 |
|   | 0.1 | 51 | 36 |
| Without addition |  | 50 | ≦20 |

EXAMPLE 2

To 100 parts of the compound of the formula:

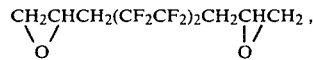

there was added the compound of the formula:

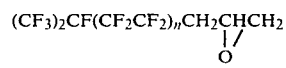

wherein n is 2, 3 or 4, in the amounts shown in Table 2 and also 3 parts of the curing agent, $BF_3C_2H_5NH_2$, to obtain a solution. The resulting solution was applied on an aluminum plate and cured at 150° C. for 2 hours. The contact angles of water and n-hexadecane against the cured coating film thus obtained were determined.

The results are shown in Table 2.

TABLE 2

| n | Amount (parts) | Contact angle (degrees) Water | n-Hexadecane |
|---|---|---|---|
| 2 | 15 | 88 | 33 |
|   | 10 | 88 | 30 |
|   | 5 | 87 | 25 |
|   | 1 | 83 | 27 |
|   | 0.1 | 81 | 19 |
| 3 | 15 | 96 | 40 |
|   | 10 | 96 | 41 |
|   | 5 | 96 | 37 |
|   | 1 | 90 | 32 |
|   | 0.1 | 80 | 20 |
|   | 0.01 | 89 | ≦20 |
|   | 0.001 | 80 | ≦20 |
| 4 | 10 | 114 | 74 |
|   | 5 | 112 | 70 |
|   | 1 | 100 | 61 |

TABLE 2-continued

| n | Amount (parts) | Contact angle (degrees) Water | n-Hexadecane |
|---|---|---|---|
| | 0.1 | 91 | 31 |
| | 0.01 | 90 | 20 |
| | 0.001 | 86 | 20 |
| Without addition | | 79 | $\leq 20$ |

EXAMPLE 3

To 100 parts of the compound of the formula:

$$CH_2CHCH_2(CF_2CF_2)_2CH_2CHCH_2,$$
$$\underset{O}{\diagdown\diagup} \qquad \underset{O}{|\diagup}$$

there was added 5 parts of the compound of the formula:

$$(CF_3)_2CF(CF_2CF_2)_4CH_2OCH_2CHCH_2.$$
$$\underset{O}{|\diagup}$$

The resulting epoxy resin composition was cured on an aluminum plate by adding a curing agent thereto as shown in Table 3. The contact angles of water and n-hexadecane against the curing coating film thus obtained were determined.

The results are shown in Table 3.

TABLE 3

| Curing agent | Parts | Curing condition Temp. (°C.) | Time | Contact angle (degrees) Water | n-Hexa-decane |
|---|---|---|---|---|---|
| Ethylenediamine | 8 | Room temp. | 4 days | 104 | 59 |
| Diaminodiphenyl-methane | 26 | 150 | 2 hrs. | 105 | 65 |
| Tetraethylene pentamine | 14 | 80 | 2 hrs. | 102 | 58 |
| Dodecenyl succinic anhydride | 130 | 150 | 20 hrs. | 98 | 52 |

EXAMPLE 4

To one part of the compound of the formula:

$$CH_2CHCH_2(CF_2CF_2)_3CH_2CHCH_2,$$
$$\underset{O}{\diagdown\diagup} \qquad \underset{O}{|\diagup}$$

there was added 0.1 part of the compound of the formula:

$$(CF_3)_2CF(CF_2CF_2)_3CH_2CHCH_2,$$
$$\underset{O}{|\diagup}$$

and the resultant was mixed homogeneously to obtain a liquid epoxy resin composition. To the resulting composition, there was added 0.14 part of tetraethylene pentamine, and the mixture was stirred for a while until it became homogeneous. The mixture was applied on an aluminum plate and cured at 80° C. for 13 hours. The contact angles of water and n-hexadecane against the cured coating film thus obtained were determined.

The results are shown in Table 4 hereinafter.

Then, the cured coating film was dipped into ethanol for 3 hours. After washing with acetone, the film was dried at 80° C. for 8 hours and the contact angles of water and n-hexadecane against the film were determined.

The results are shown in Table 5 hereinafter.

COMPARATIVE EXAMPLE 1

The same procedure as described in Example 4 was repeated except that $(CF_3)_2CF(CF_2CF_2)_3CH_2CH_2OH$ was substituted for $$(CF_3)_2CF(CF_2CF_2)_3CH_2CHCH_2$$
$$\underset{O}{|\diagup}$$

to obtain a cured coating film. In this case, although phase separation of the resulting homogeneous mixture was observed as curing progressed, the same procedure was carried out. The contact angles of water and n-hexadecane against the resulting cured coating film were determined before and after the same treatments as described above, i.e. dipping into ethanol, washing with acetone and drying.

The results are also shown in Tables 4 and 5 hereinafter.

COMPARATIVE EXAMPLE 2

The same procedure as described in Example 4 was repeated except that $$(CF_3)_2CF(CF_2CF_2)_3CH_2CHCH_2$$
$$\underset{O}{|\diagup}$$

was not added to obtain a cured coating film. Likewise, the contact angles of water and n-hexadecane against the resulting coating film were determined before and after the same treatments with ethanol and acetone.

The results are also shown in Tables 4 and 5.

TABLE 4

| Examples | Contact angle (degrees) Water | n-Hexadecane |
|---|---|---|
| Example 4 | 96 | 43 |
| Comparative Example 1 | 99 | 57 |
| Comparative Example 2 | 52 | 21 |

TABLE 5

| Examples | Contact angle (degrees) Water | n-Hexadecane |
|---|---|---|
| Example 4 | 96 | 41 |
| Comparative Example 1 | 78 | 26 |
| Comparative Example 2 | 76 | 22 |

The present invention being thus described, it will be obvious that the same may be varied in many ways. Such modifications are not to be regarded as a departure from the spirit and scope of the present invention, and all such modifications are intended to be included within the scope of the following claims.

What is claimed is:

1. An epoxy resin composition, which comprises:
   (1) a monoepoxide having at least one perfluoroalkyl group in one molecule of the formula:

$$R_f(CH_2)_mO_nCH_2CHCH_2 \atop \diagdown\!O\!\diagup$$

wherein $R_f$ is a perfluoroalkyl group having 1 to 18 carbon atoms; m is 0 or an integer from 1 to 3; and n is 0 or 1, or a mixture thereof; and (2) an epoxy resin having two or more epoxy groups in one molecule, the weight ratio of (1):(2) being 0.05:99.95 to 50:50.

2. An epoxy resin composition according to claim 1, wherein said monoepoxide is the compound of the formula:

$$CF_3CF_2(CF_2CF_2)_3CH_2OCH_2CHCH_2. \atop \diagdown\!O\!\diagup$$

3. An epoxy resin composition according to claim 1, wherein said monoepoxide is the compound of the formula:

$$\begin{array}{c}CF_3\\ \phantom{CF_3}\diagdown\\ CF_3\diagup\end{array}\!CF(CF_2CF_2)_4CH_2OCH_2CHCH_2. \atop \phantom{CF_3CF(CF_2CF_2)_4CH_2OCH_2}\diagdown\!O\!\diagup$$

4. An epoxy resin composition according to claim 1, wherein said monoepoxide is the compound of the formula:

$$\begin{array}{c}CF_3\\ \phantom{CF_3}\diagdown\\ CF_3\diagup\end{array}\!CF(CF_2CF_2)_4CH_2CHCH_2. \atop \phantom{CF_3CF(CF_2CF_2)_4CH_2}\diagdown\!O\!\diagup$$

5. An epoxy resin composition according to claim 1, wherein said monoepoxide is the compound of the formula:

$$CF_3CF_2(CF_2CF_2)_3CH_2CH_2CHCH_2 \atop \diagdown\!O\!\diagup$$

6. An epoxy resin composition according to claim 1 wherein said epoxy resin is a compound of the formula:

$$CH_2CHRCHCH_2 \atop \diagdown\!O\!\diagup \ \ \diagdown\!O\!\diagup$$

or $$CH_2CHCH_2OR-(OCH_2CHCH_2OR)_j-OCH_2CHCH_2 \atop \diagdown\!O\!\diagup \phantom{-(OCH_2CH}\!\!|\phantom{CH_2OR)_j-O}\diagdown\!O\!\diagup \atop \phantom{CH_2CHCH_2OR-(OCH_2CH}OH$$

wherein j is 0 or an integer from 1 to 15; and R is $C_kH_{2k}$ wherein k is an integer from 2 to 8, $(CH_2)_y(CF_2)_p(CH_2)_y$ wherein y is 1 or 2 and p is an integer from 2 to 10, or a group of the formula:

[structures: bisphenol-A type with CH_3/CH_3; hexafluoro type with CF_3/CF_3; and a phenylene bridged bis-hexafluoroisopropyl group with $R_f$]

wherein $R_f'$ is a perfluoroalkyl group having 3 to 10 carbon atoms, or a mixture thereof.

7. An epoxy resin composition according to claim 6, wherein said epoxy resin is the compound of the formula:

$$CH_2CHCH_2O(CH_2)_4OCH_2CHCH_2. \atop \diagdown\!O\!\diagup \phantom{CH_2O(CH_2)_4OCH_2}\diagdown\!O\!\diagup$$

8. An epoxy resin composition according to claim 6 wherein said epoxy resin is a compound of the formula:

$$CH_2CHCH_2(CF_2)_{p'}CH_2CHCH_2 \atop \diagdown\!O\!\diagup \phantom{CH_2(CF_2)_{p'}CH_2}\diagdown\!O\!\diagup$$

wherein p′ is an integer from 4 to 10.

9. An epoxy resin composition according to claim 6, wherein said epoxy resin is a compound of the formula:

$$CH_2CHCH_2OCH_2(CF_2)_{p''}CH_2OCHCH_2. \atop \diagdown\!O\!\diagup \phantom{CH_2OCH_2(CF_2)_{p''}CH_2O}\diagdown\!O\!\diagup$$

wherein p″ is an integer from 3 to 10.

10. An epoxy resin composition according to claim 1, wherein said weight ratio of (1):(2) is 1:99 to 30:70.

11. An epoxy resin composition according to claim 1, wherein the $R_f$ group in the formula of the monoepoxide is a perfluoroalkyl group having 3 to 18 carbon atoms.

12. A curable composition, which comprises:
(1) a monoepoxide having at least one perfluoroalkyl group in one molecule of the formula:

$$R_f(CH_2)_mO_nCH_2CHCH_2 \atop \diagdown\!O\!\diagup$$

wherein $R_f$ is a perfluoroalkyl group having 1 to 18 carbon atoms; m is 0 or an integer from 1 to 3; and n is 0 or 1, or a mixture thereof;

(2) an epoxy resin having two or more epoxy groups in one molecule, the weight ratio of (1):(2) being 0.05:99.95 to 50:50; and (3) a curing agent.

* * * * *